(12) United States Patent
Cheng

(10) Patent No.: US 7,733,506 B2
(45) Date of Patent: Jun. 8, 2010

(54) OPTICAL TILT MONITORING APPARATUS

(75) Inventor: Kwok Sing Cheng, Hong Kong SAR (CN)

(73) Assignee: Hong Kong Applied Science and Technology Research Institute Co., Ltd., Hong Kong SAR (CN)

(*) Notice: Subject to any disclaimer, the term of this patent is extended or adjusted under 35 U.S.C. 154(b) by 417 days.

(21) Appl. No.: 11/693,587

(22) Filed: Mar. 29, 2007

(65) Prior Publication Data

US 2008/0239324 A1    Oct. 2, 2008

(51) Int. Cl.
*G01B 11/14* (2006.01)
(52) U.S. Cl. ............... 356/614; 356/237.2; 356/237.6; 356/622
(58) Field of Classification Search ... 356/237.2–237.6, 356/138, 623, 614, 622, 432, 249
See application file for complete search history.

(56) References Cited

U.S. PATENT DOCUMENTS

| | | |
|---|---|---|
| 5,101,570 A | 4/1992 | Shimura |
| 5,218,415 A | 6/1993 | Kawashima |
| 5,742,383 A | 4/1998 | Jeon |
| 5,883,709 A | 3/1999 | Okuda et al. |
| 5,893,215 A | 4/1999 | Kumagai et al. |
| 6,984,838 B2* | 1/2006 | Kosugi ............ 356/401 |
| 7,042,581 B2* | 5/2006 | Schietinger et al. ...... 356/237.2 |
| 2001/0042846 A1 | 11/2001 | Togashi |

FOREIGN PATENT DOCUMENTS

JP   2001-183121   7/2001

OTHER PUBLICATIONS

International Search Report Application No. PCT/CN2007/070875 dated Jan. 10, 2008.

* cited by examiner

*Primary Examiner*—Gregroy J Toatley, Jr.
*Assistant Examiner*—Iyabo S Alli
(74) *Attorney, Agent, or Firm*—Buchanan Ingersoll & Rooney PC

(57) ABSTRACT

An optical arrangement includes a position sensitive optical detector, a collimated optical source, and a processor configured to monitor the inclination of an object. The collimated optical source is configured to transmit a collimated beam towards the object. The position sensitive optical detector is configured to detect the specific location of incidence of an optical signal received from the object, and the processor is configured to generate information relating to the inclination of the object from processing optical signals received at the position sensitive optical detector.

25 Claims, 10 Drawing Sheets

Inset B Square Quad Photodiode

Inset A Circular Quad Photodiode

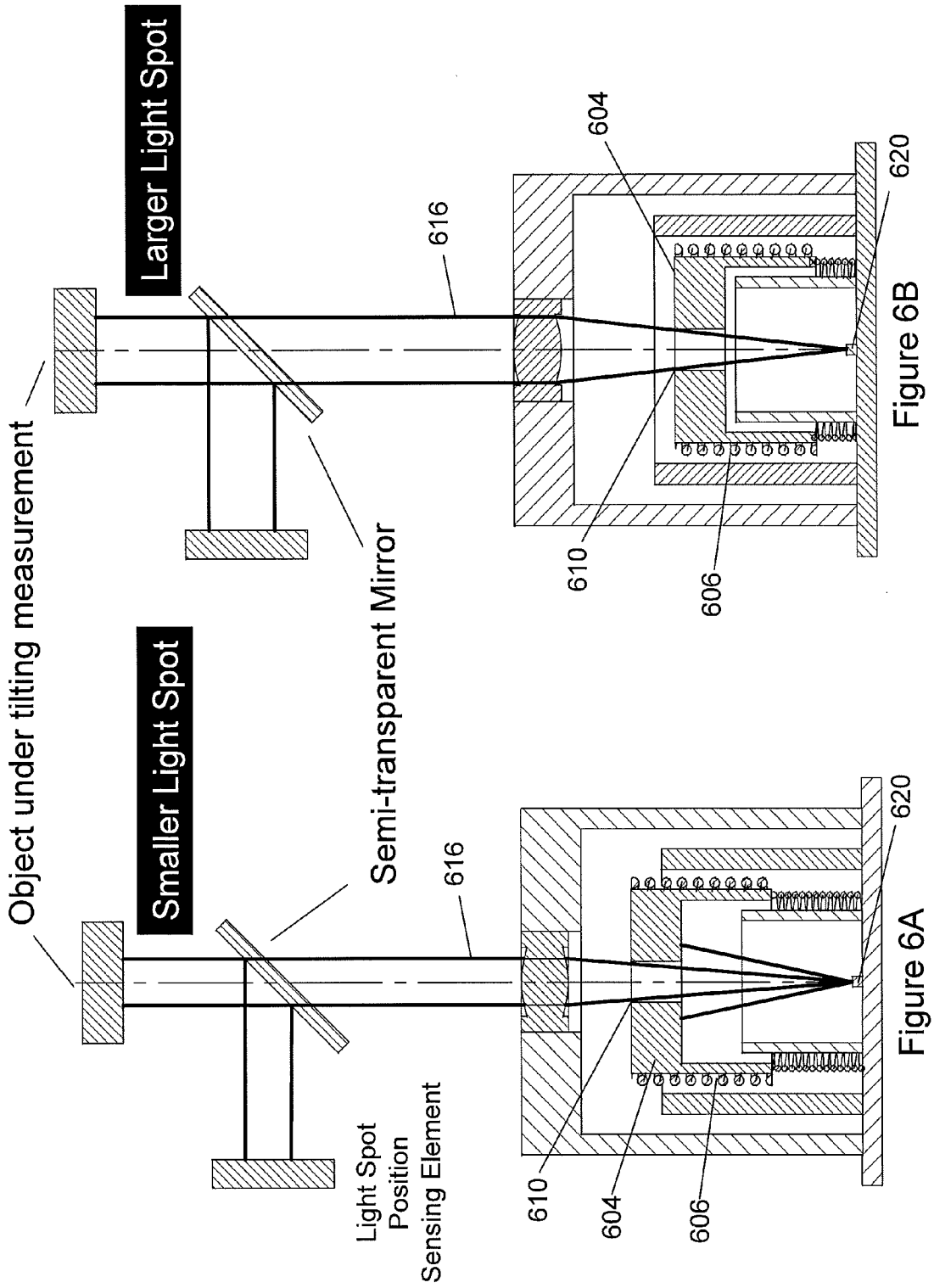

OPTICAL TILT MONITORING APPARATUS

FIELD OF THE INVENTION

The present invention relates to tilt monitoring apparatus, and more particularly to optical tilt monitoring apparatus for monitoring the tilting of small articles, such as components of electronic circuits.

BACKGROUND OF THE INVENTION

Measurement of inclination of an object provides a lot of useful information in relation to the physical conditions of the object. For example, the measurement of tilting of a structure, such as a bridge or a building, provides useful information on the safety and stability of the structure.

Tilt measurement apparatus are generally categorized as the "contact-type" or the "non-contact type". In the contact-type apparatus, a sensor is usually mounted on an object the inclination of which is to be measured. An example of the contact-type tilt measurement apparatus is descried in U.S. Pat. No. 5,218,771. However, it is not always possible or practical to use a contact-type tilt measurement apparatus. For example, it is frequently necessary to measure the relative tilting of various components mounted or to be mounted on a printed circuit board during or after the assembly process. Due to the high through-put demand or the high-density nature of the mounting of various components, the contact-type tilt measurement sensor is usually neither appropriate nor practical. On the other hand, a non-contact-type tilt measurement apparatus requires no mounting and/or dismounting of sensors on individual components which form part of a larger scale component integration. Therefore, the non-contact-type tilt measurement apparatus is especially suitable for such high through-put and high-density packaging environment.

Therefore, it would be advantageous to provide a non-contact-type tilt measurement apparatus which mitigates or alleviates shortcomings of the contact-type tilt measurement apparatus.

SUMMARY OF THE INVENTION

According to the present invention, there is provided an optical arrangement comprising a position sensitive optical detector, a collimated optical source, and a processor configured to monitor the inclination of an object; wherein
said collimated optical source is configured to transmit a collimated beam towards said object,
said position sensitive optical detector is configured to detect the specific location of incidence of an optical signal received from said object, and
said processor is configured to generate information relating to the inclination of said object from processing optical signal received at said position sensitive optical detector By using an optical assembly with a collimated optical source in combination with a position sensitive optical detector, the relative tilting of the various components forming part of a larger scale integration may be evaluated with a relatively high through-put speed and a relatively high accuracy. In addition, the combination of an optical source with a collimated beam output with an optical detector using position sensitive photo-detector facilitates more efficient monitoring of the inclination of relatively small components, since the beam spot dimension of a collimated beam source may be adjusted to fit on a small surface to be monitored.

When the monitoring of tilting of a larger object is required, a collimated beam with a larger beam spot, or an optical source comprising a plurality of collimated beams to be distributedly aimed at a plurality of locations on the larger object, may be utilized to evaluate the extent of tilting by monitoring the reception of light after the light having encountered the larger object and then collected by a corresponding plurality of position sensitive optical detectors.

The position sensitive optical detector may comprise circuitry which is configured to generate an output signal which is dependent on the specific location of incidence of an optical signal on said position sensitive optical detector, and the position sensitive optical detector may be aligned to receive an optical signal from said object with said object at a reference inclination.

For example, the position sensitive optical detector may comprise a plurality of component optical detectors, said optical detectors being arranged to generate information relating to the spatial distribution of an incident optical signal among said plurality of component optical detectors to give said location specific information of an incident beam.

Advantageously, the position sensitive optical detector may comprise a plurality of photo-detectors, and said photo-detectors are arranged about at least one axis of symmetry.

In a convenient example, the position sensitive optical detector may comprise at least one pair of photo-diodes distributed on either side of said at least one axis of symmetry.

The information on the inclination of said object may be obtained by processing the differences of output of said position sensitive optical detector from the two sides of said axis of symmetry.

In another example, the position sensitive optical detector may be received within an enclosure and is optically communicable with said object through an aperture defined by said enclosure, and said aperture is configured to restrict reception of scattered light from said object.

The aperture may also be configured to block light reflected from said object and corresponding to light reflected from outside a maximum extent of inclination of said object.

In addition, an optical diffuser may be disposed intermediate said aperture and said position sensitive optical detector for equalising the intensity of the incident light on said position sensitive optical detector.

For example, the optical source may comprise an LED or a laser source.

The optical detector may comprise a quadrant photodiode, a CMOS sensor, or a position-sensing detector.

In an example, the photo-sensitive area of said position sensitive optical detector may be less than 4 $mm^2$.

A beam splitter may be disposed intermediate said object and said collimated optical source. The optical arrangement may be mounted within a compact housing by using a beam splitter arrangement.

In such an example, the collimated optical source is configured to transmit said collimated optical beam along a first optical axis towards said object, and said beam splitter comprises a semi-transparent mirror which is arranged to forward partially reflected light from said object to said position sensitive optical detector Typically, the semi-transparent mirror may be disposed at 45 degrees to said first optical axis, and the photo-sensitive area of said position sensitive optical detector is substantially parallel to said first optical axis of said collimated optical beam and arranged so that the partially reflected light from said object impinges upon said photo-sensitive area of said position sensitive optical detector at a substantially normal incidence.

In such an exemplary arrangement, the photo-sensitive area of said position sensitive optical detector may be substantially parallel to said first optical axis.

Optionally, the arrangement may further comprise an optical reflector which is disposed intermediate said beam splitter and said position sensitive optical detector, wherein said reflector is configured to alter the optical path of said partially reflected light such that the altered optical path is substantially parallel to said first optical axis, and the photo-sensitive area of said position sensitive optical detector is coplanar with the optical source.

Furthermore, an optional aperture may be defined intermediate said object and said position sensitive optical detector, and said aperture is dimensioned to limit the detection of scattered light from said object.

The size of said aperture is comparable to the size of said collimated optical beam.

For example, the collimated optical beam may have a spot diameter is in the region of 0.2 mm to 1.2 mm diameter.

As a further option, the arrangement may further comprise an aperture control mechanism to vary the effective area of photo-collection on said position sensitive optical detector.

The aperture control mechanism may comprise a movement arrangement to change the relative displacement between said aperture and said photo-sensitive area of said position sensitive optical detector.

For example, the movement arrangement comprises a magnetic field driven voice coil.

In another aspect of this invention, there is described a tilt monitoring apparatus for monitoring of the inclination of an object comprising an optical assembly as described herein.

BRIEF DESCRIPTION OF THE DRAWINGS

Preferred embodiments of the present invention will be explained in further detail below by way of examples and with reference to the accompanying drawings, in which:—

FIGS. 6A and 6B illustrate a fifth embodiment of this invention.

DETAILED DESCRIPTION OF THE PREFERRED EMBODIMENTS

Figure 1:
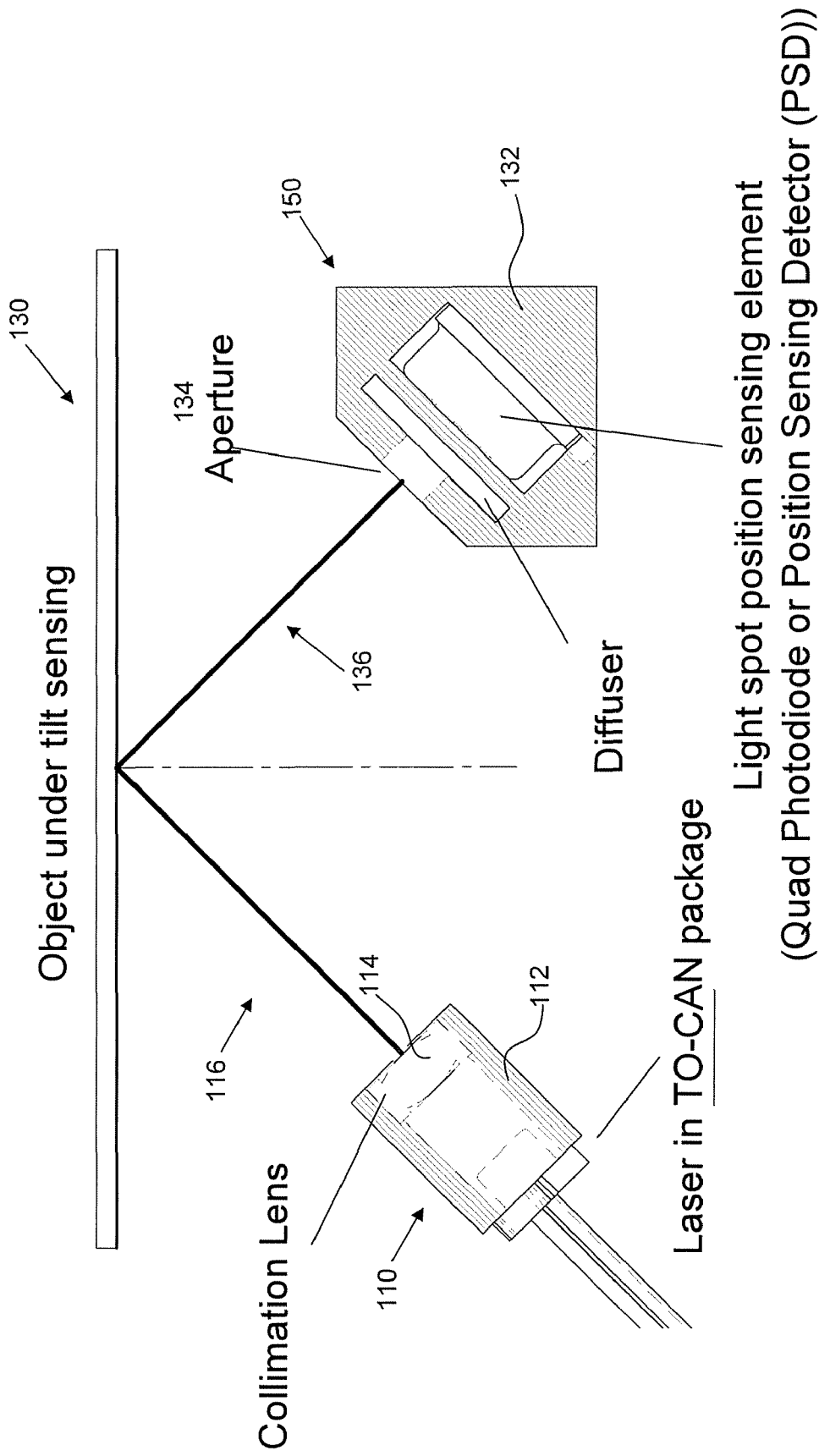
FIG. 1 illustrates a first embodiment of this invention.

A first embodiment of this invention of an optical assembly 100 for monitoring the tilting of an object is shown in FIG. 1, and comprises an optical source 110 for emitting a collimated beam towards an object 130 and a position sensitive optical detector 150 for detecting the emitted light after reflection by the object 130. The optical source comprises a laser packaged in a TO-CAN package and enclosed within a housing 112. A collimating lens 114 is disposed at the forward end of the housing so as to collimate the optical beam generated by the laser optical source for transmitting light towards the object substantially along an optical output axis 116. The optical detector 150 is enclosed within a housing 132 which defines a light reception aperture 134 at the front end of the housing. The reception aperture 134 is dimensioned so as to allow passage of only light reflected from an object due to an incident light travelling along the detection axis 136. More particularly, the reception aperture is dimensioned to allow reception of reflected light within a prescribed maximum range of inclination of the object to be monitored, corresponding to the angular detection range of the optical arrangement. By choosing a laser source with an appropriate light emitting aperture in combination with an appropriate collimating lens, a beam spot of a diameter of between 0.2 mm to 0.4 mm (or larger) can be projected towards the object. Notably, the reception aperture 134 has a comparable, although slightly larger, dimension for detection of the light in order to be reflected by an object. A diffuser is disposed intermediate the aperture and the optical detection surface of the optical detector 150 so as to equalize the intensity of the incident light to mitigate adverse influence due to scattering of light by the reflection surface of an object, especially when the surface to be monitored is not a perfect reflective surface.

Figure 2B:
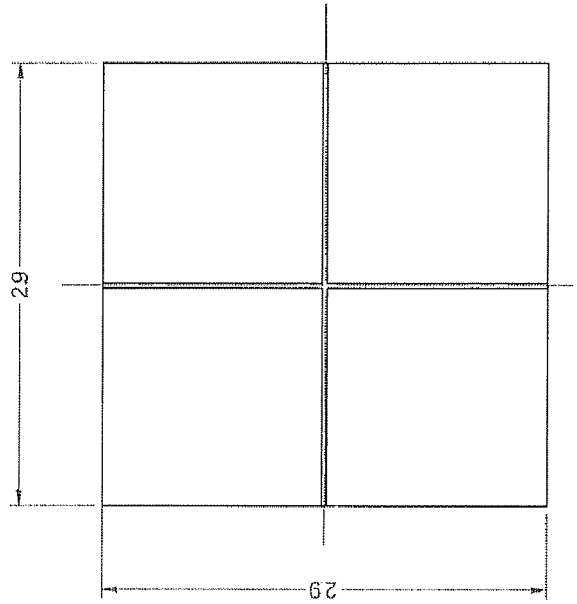
FIGS. 2A and 2B illustrate examples of position sensitive photo-detectors comprising four component photo-diodes.
Figure 2A:
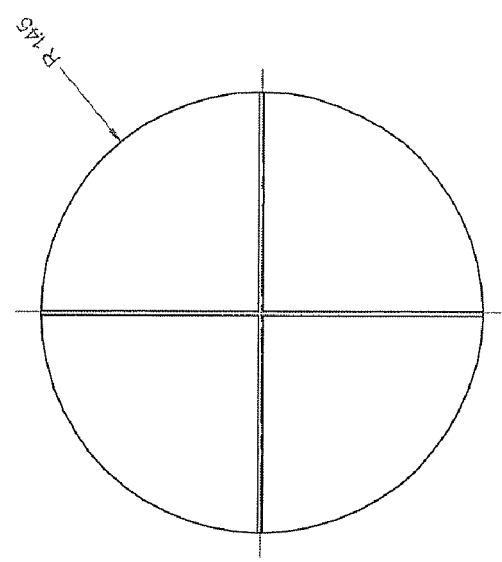

A quad-photo-diode, which is commonly available either as a square or a circular quad-photo-diode as shown in FIGS. 2A and 2B respectively, are suitable for application as a component in the optical detector to provide position information on the location or location distribution of an incident beam. Of course, other position-sensitive photo-detectors suitable for providing information on an incident beam may be used. Quad-photo-diodes are commercially available and are known to persons skilled in the art. The optical source and the optical detector are arranged so that the incoming optical beam due to reflection of the collimated beam emitted by the optical source will impinge centrally on the detection surface of the optical detector when this is not tilting. In such a case, the incoming beam will come along a neutral optical detection axis defined by the plane of the quad-photo-diode which corresponds to no inclination of the object.

Figure 1A:
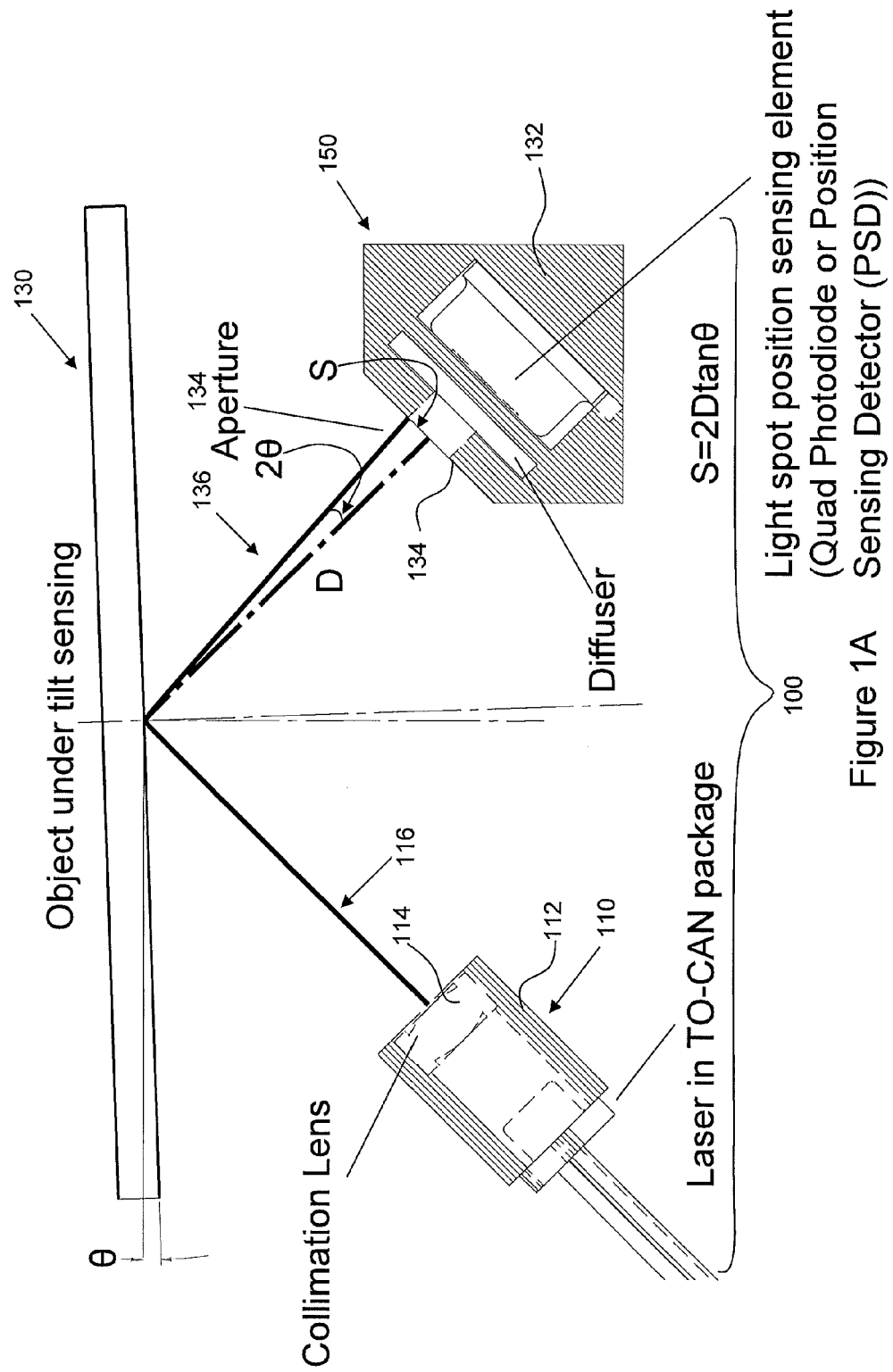
FIG. 1A illustrates schematically the arrangement of FIG. 1 in operation with the object having rotated by an angle of tilt θ in a counter-clockwise manner.
Figure 1B:
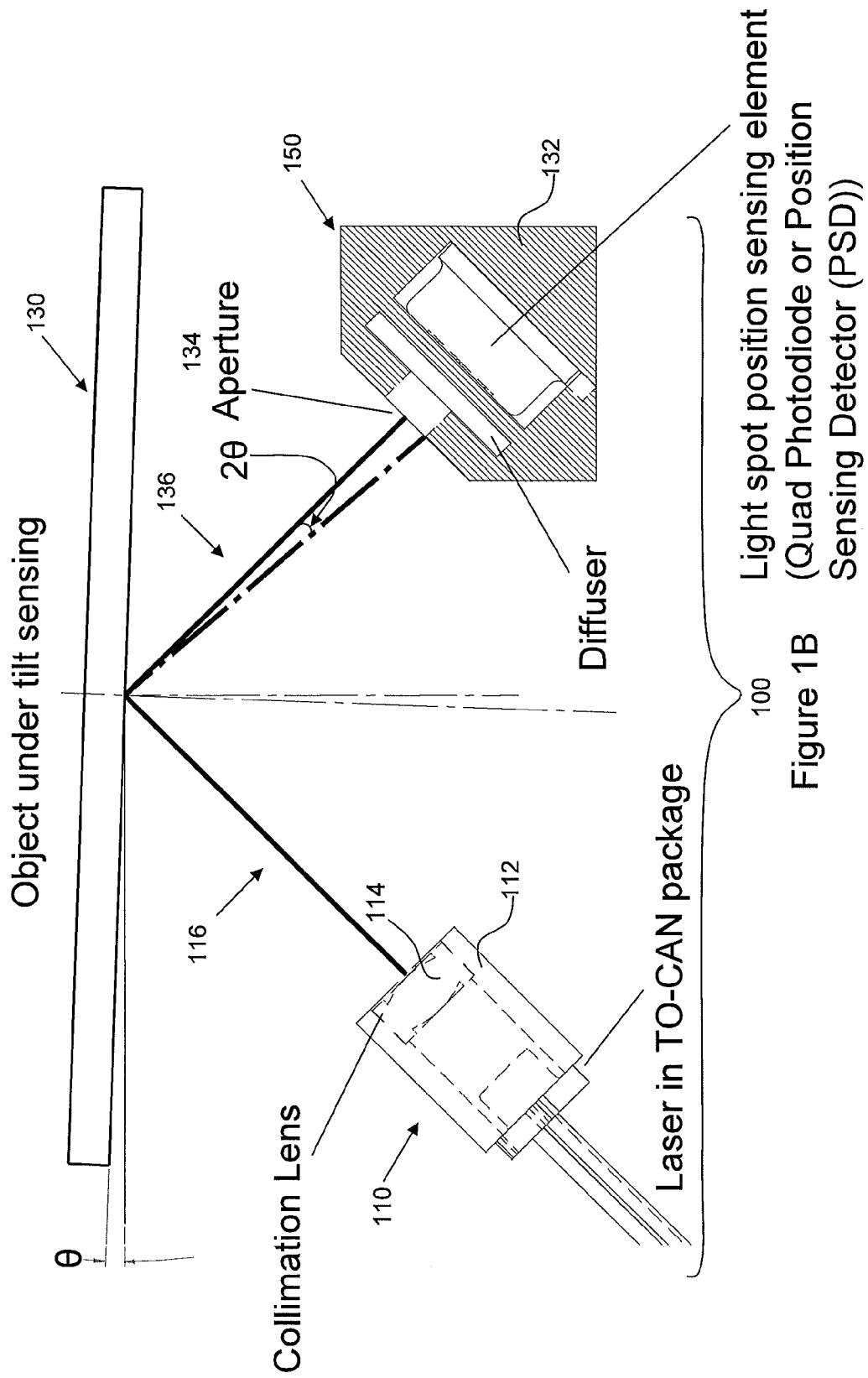
FIG. 1B illustrates schematically the arrangement of FIG. 1 in operation with the object having rotated by an angle of tilt θ in a clockwise manner.

Referring to FIG. 1A, the object has rotated counter-clockwisely for an angle θ. As a result, the reflected beam will also deviate by an angle of θ, also counter-clockwisely. The complete cone of beam divergency defines the extent of angular tilting θ. By measuring the change in the optical detection axis of the quad-photo-diode, the angular deviation relationship can be obtained by the relationship S=2D tangent θ, where S is the displacement incoming optical detection axis, D is the distance between the centre of the quad-photo-diode to the spot of light incidents on the object and θ is the angular inclination of the object. In FIG. 1B, the object has tilted for an angle of θ clockwisely and the axis of the incoming beam is also deviated for an angle of θ.

As shown in FIGS. 2A and 2B, a typical quad-photo-diode usually includes at least an axis of symmetry. When an incident beam impinges on the quad-photo-diode with balanced illumination on both sides of the symmetrical axis, a nil or balanced output will be detected. When an incident beam impinges on the quad-photo-diode with a skewed angle of incidence, the non-balanced illumination on the component photo-diodes on either sides of the symmetrical axis will produce an non-zero or unbalanced output, indicating a skewed incidence. By evaluating the difference in the output of the component photo-detectors, and with such information evaluated by a processor, such as a micro-controller or a micro-processor, the skew information, which indicates the extent of inclination, could be calculated. By arranging the optical source and the quad-photo-diode so that the axis of incoming beam to the quad-photo-diode with no tilting or inclination of the object being coincident with the balanced detection axis of the quad-photo-diode, a useful reference could be obtained.

Figure 3A:
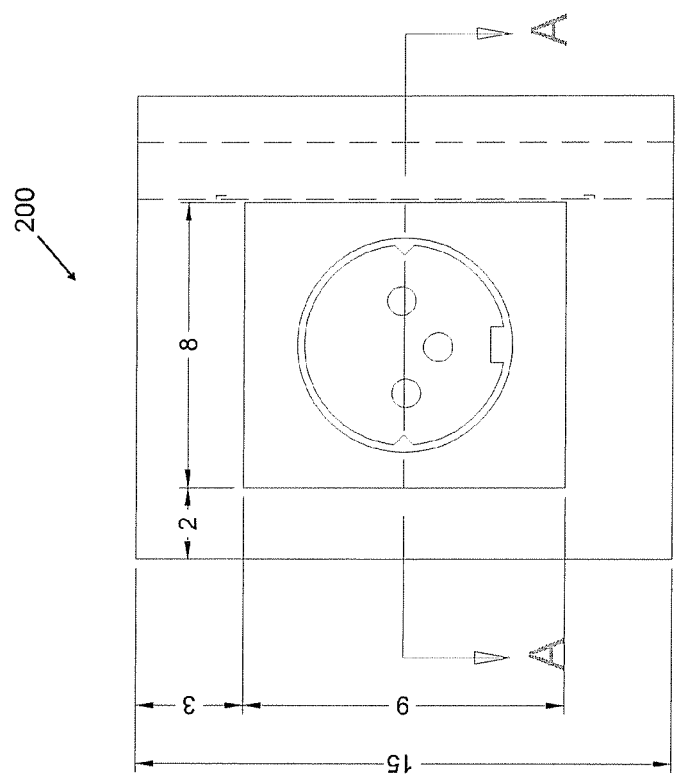
FIG. 3A shows a top plan view of the device of FIG. 3.
Figure 3:
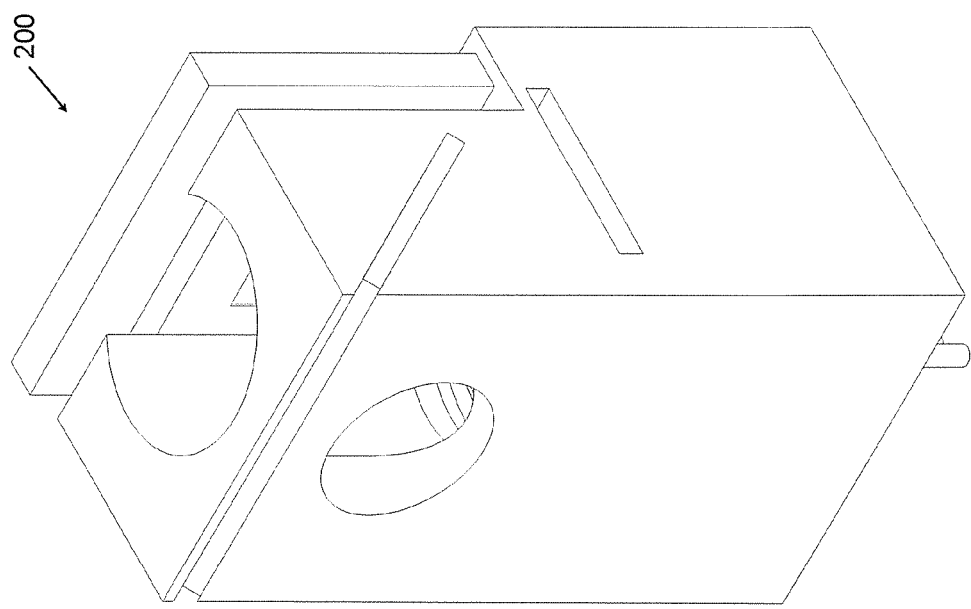
FIG. 3 shows a perspective view of a second embodiment of this invention.
Figure 3B:
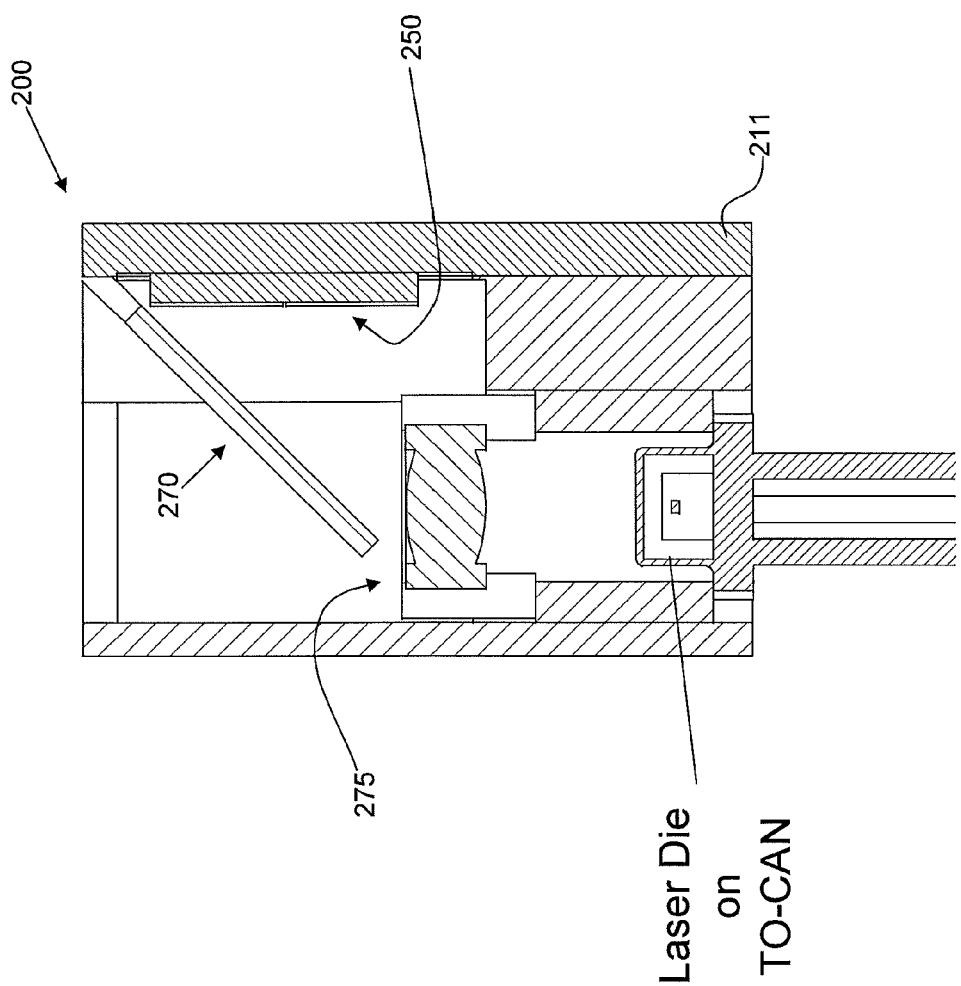
FIG. 3B shows a longitudinal view of the device of FIG. 3 along the section line A-A of FIG. 3A.
Figure 3C:
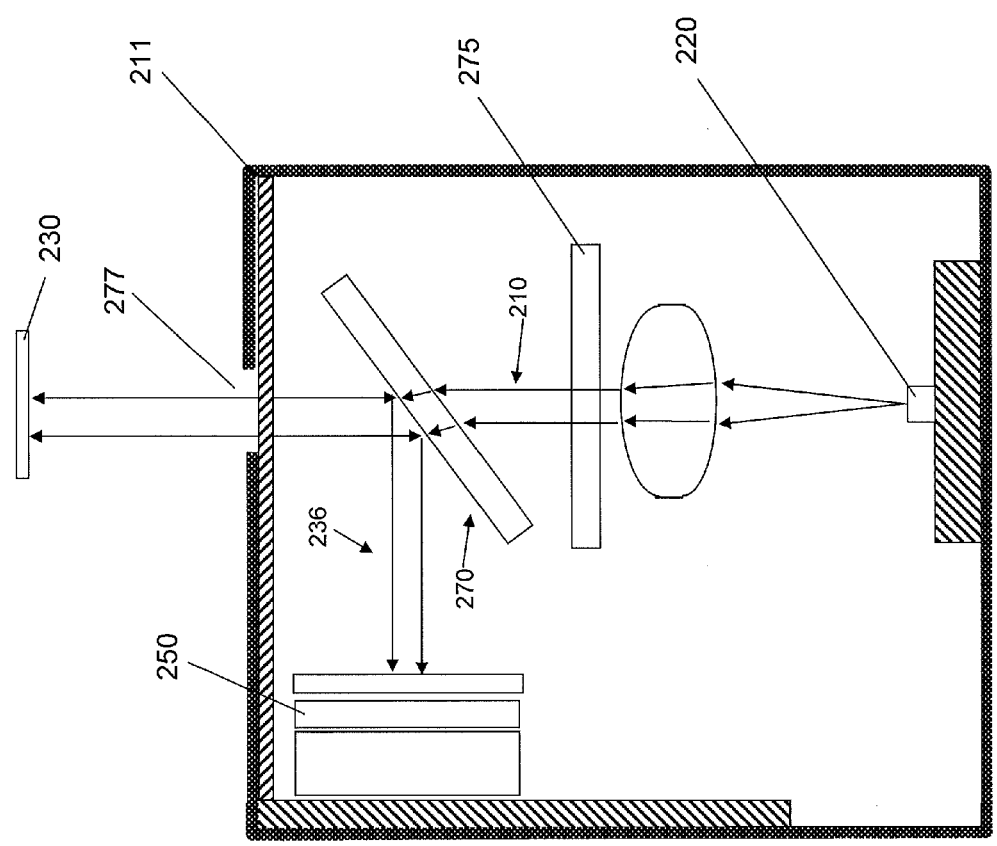
FIG. 3C illustrates schematically the operation of the optical arrangement of FIG. 3.

In the second preferred embodiment 200 of the optical arrangement as shown in FIGS. 3 to 3C, the optical arrangement is in a modular form with the optical source 220 and the quad-photo-diode as an example of a position sensitive optical detector 250 enclosed within a monolithic housing 211. To facilitate a compact design, a semi-transparent mirror 270 is disposed at 45° to the optical output axis of the optical source and with the optical detection axis 236 of the quad-photo-diode 250 disposed at 90° to the optical output axis 210 or at 45° to the reflection plane of the mirror 270. As shown in FIG. 3C, a collimated beam emitted by the optical source is collimated by a collimating lens 275, and defined by an exit aperture 277, for transmission towards the object 230 after passing through the semi-transparent mirror 270. The optical beam, upon reflection by the object 230, will be reflected by the semi-transparent mirror 270 towards the quad-photo-diode 250. Similarly, the inclination of the object could be evaluated by detecting the differences in optical detection due to an inclined object with reference to the reference output as calibrated with reference to a non-inclined reference plane.

Figure 4:
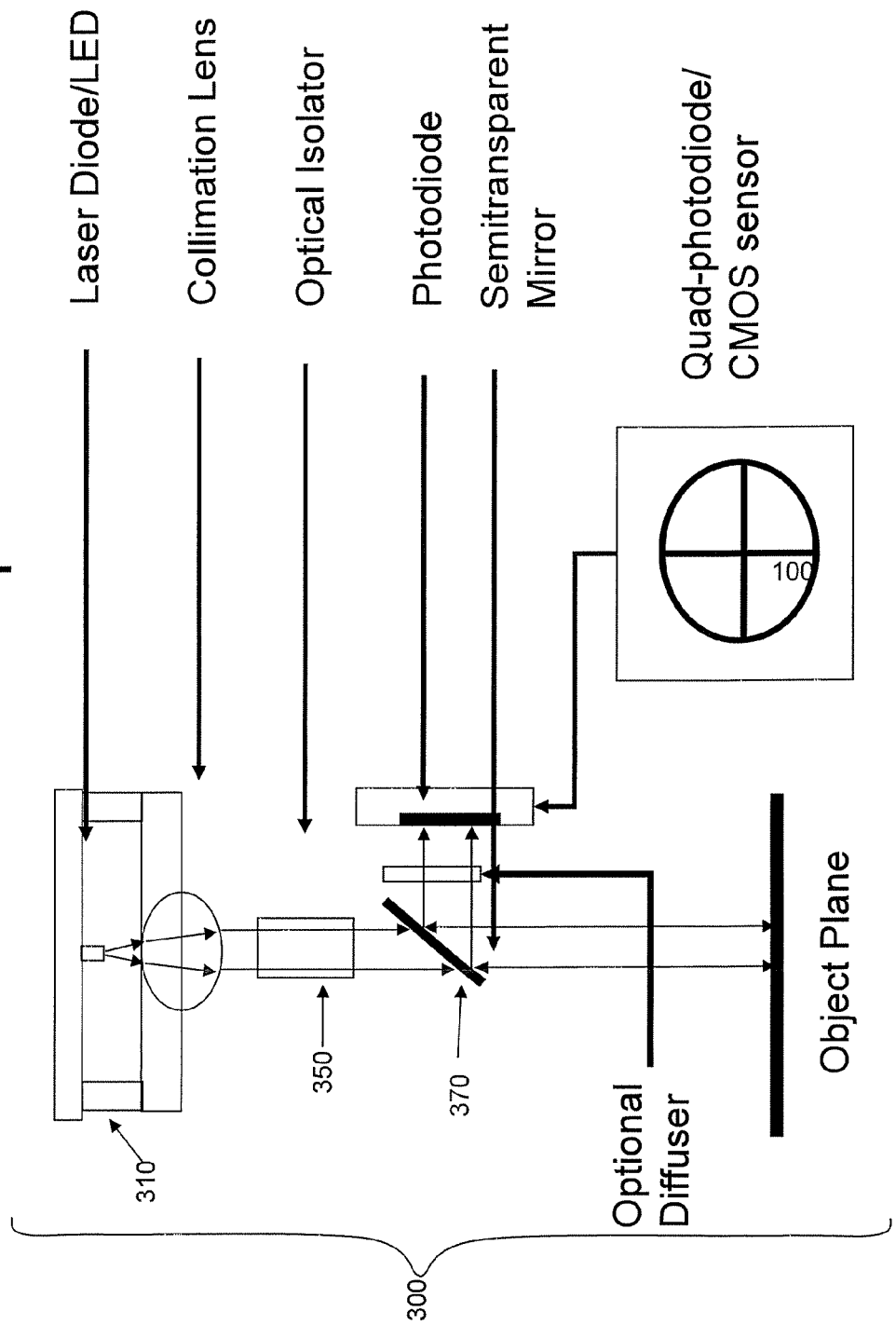
FIG. 4 illustrates a third embodiment of an optical assembly of this invention.

The third preferred embodiment 300 of this invention as shown in FIG. 4 is substantially identical to the arrangement of FIGS. 3 to 3C, except that an optical isolator 350 is disposed intermediate the semi-transparent mirror 370 and the optical source 310. A circular quad-photo-diode as another example of position sensitive optical detector is depicted in FIG. 4 to illustrate the plan view of the effective optical detection surface of an exemplary circular quad-photo-diode.

Figure 5:
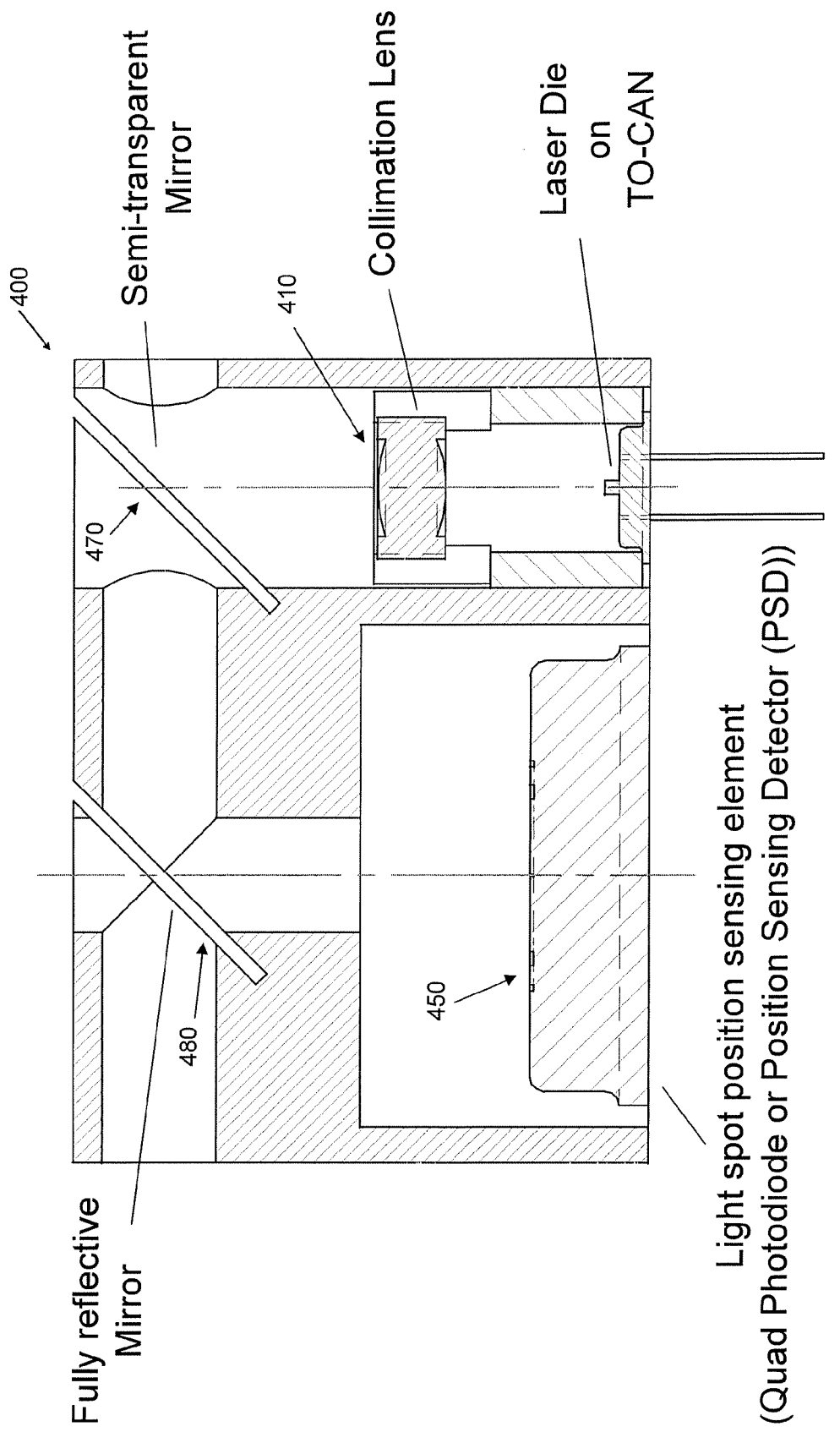
FIG. 5 illustrates schematically a fourth embodiment of this invention.

In the fourth preferred embodiment 400 of this invention as shown in FIG. 5, the optical output axis of the optical source 410 and the optical detection axis of the quad-photo-diode 450 are substantially parallel. This is facilitated by including a fully reflective mirror 480 as well as a semi-transparent mirror 470 as shown in FIG. 5. The arrangement of FIG. 5 is also housed within an enclosure with a semi-transparent mirror disposed at 45° to the optical output axis of the optical source. A fully reflective mirror is disposed at 45° to the optical detection axis of the quad-photo-diode, with its reflective surface parallel to the reflective surface of the semi-transparent mirror. By arranging a pair of lens comprising a semi-transparent mirror at 45° to the optical path of the optical source and another reflective mirror at 45° to the optical detection axis of the quad-photo-diode, and with the reflection surface of both mirrors parallel to each other, the optical source and the quad-photo-diode can be arranged so that they are on the same side of the object. As such, it is no necessary to arrange an object whose inclination is to be monitored intermediate the optical source and the quad-photo-diode.

A further variation of the arrangement of FIG. 3 is shown in FIGS. 6A and 6B and comprising a movable aperture 610 which is disposed along the optical path 616 of the optical source so as to vary the effective dimension of the aperture 610. In this variation, an aperture defined by a movable component 604 is movable by an arrangement of coils 606, more commonly known as a voice coil movement mechanism. The voice coil movement mechanism comprises a stationary coil and a movable coil attached to a movable component 604 with the axis being co-axial. The distance of the aperture 604 from the light emitting surface of the optical source 620 can be adjusted by changing the electric current in the two coils in a magnetic levitating manner as shown in FIG. 6A by moving the movable component away from the light emitting surface of the optical source, a narrower beam will be defined. Likewise, by moving the movable component 604 towards the light emitting surface of the optical source, a larger beam will result. By adjusting the dimension of the beam spot through movement of the movable aperture 604, an appropriate beam spot size can be adjusted for appropriate applications. For example, by moving the movable component along the optical axis of the optical source, the beam spot diameter can be changed from between 0.2 mm to 0.4 mm, although a typical beam spot could have a diameter of about 0.1 mm.

While the present invention has been explained by reference to the examples or preferred embodiments described above, it will be appreciated that those are examples to assist understanding of the present invention and are not meant to be restrictive. Variations or modifications which are obvious or trivial to persons skilled in the art, as well as improvements made thereon, should be considered as equivalents of this invention.

Furthermore, while the present invention has been explained by reference to a tilt monitoring apparatus for small objects, it should be appreciated that the invention can apply, whether with or without modification, to larger objects without loss of generality.

The invention claimed is:

1. An optical arrangement, comprising:
   a position sensitive optical detector;
   a collimated optical source;
   and a processor configured to monitor the inclination of an object;
      wherein said collimated optical source being configured to transmit a single collimated beam towards said object,
      said position sensitive optical detector being configured to detect the specific location of incidence of an optical signal received from said object, said position sensitive optical detector being received within an enclosure and being optically communicable with said object through an aperture defined by said enclosure, said aperture being configured to restrict reception of scattered light from said object,
      said processor being configured to generate information relating to the inclination of said object from processing the optical signal received at said position sensitive optical detector.

2. An optical arrangement according to claim 1, wherein said position sensitive optical detector comprises circuitry which is configured to generate an output signal which is dependent on the specific location of incidence of an optical signal on said position sensitive optical detector, and said position sensitive optical detector is aligned to receive an optical signal from said object with said object at a reference inclination.

3. An optical arrangement according to claim 1, wherein said position sensitive optical detector comprises a plurality of component optical detectors, said optical detectors being arranged to generate information relating to the spatial distribution of an incident optical signal among said plurality of component optical detectors to give said location specific information of an incident beam.

4. An optical arrangement according to claim 3, wherein said position sensitive optical detector comprises a plurality of photo-detectors, and said photo-detectors are arranged about at least one axis of symmetry.

5. An optical arrangement according to claim 4, wherein said position sensitive optical detector comprises at least one pair of photo-diodes distributed on either side of said at least one axis of symmetry.

6. An optical arrangement according to claim 5, wherein information on the inclination of said object is obtained by processing the differences of output of said position sensitive optical detector from the two sides of said axis of symmetry.

7. An optical arrangement according to claim 1, wherein said aperture is also configured to block light reflected from said object and corresponding to light reflected from outside a maximum extent of inclination of said object.

8. An optical arrangement according to claim 1, wherein an optical diffuser is disposed intermediate said aperture and said position sensitive optical detector for equalising the intensity of the incident light on said position sensitive optical detector.

9. An optical arrangement according to claim 1, wherein said optical source comprises an LED or a laser source.

10. An optical arrangement according to claim 9, wherein said position sensitive optical detector comprises a quadrant photodiode, a position-sensing detector or a CMOS sensor.

11. An optical arrangement according to claim 1, wherein the photo-sensitive area of said position sensitive optical detector is less than 4 mm$_2$.

12. An optical arrangement according to claim 1, wherein a beam splitter is disposed intermediate said object and said collimated optical source.

13. An optical arrangement according to claim 12, wherein said collimated optical source is configured to transmit said collimated optical beam along a first optical axis towards said object, and said beam splitter comprises a semi-transparent mirror which is arranged to forward partially reflected light from said object to said position sensitive optical detector.

14. An optical arrangement according to claim 13, wherein said semi-transparent mirror is disposed at 45 degrees to said first optical axis, and the photo-sensitive area of said position sensitive optical detector is substantially parallel to said first optical axis of said collimated optical beam and arranged so that the partially reflected light from said object impinges upon said photo-sensitive area of said position sensitive optical detector at a substantially normal incidence.

15. An optical arrangement according to claim 14, wherein the photo-sensitive area of said position sensitive optical detector is substantially parallel to said first optical axis.

16. An optical arrangement according to claim 15, further comprising an optical reflector which is disposed intermediate said beam splitter and said position sensitive optical detector, wherein said reflector is configured to alter the optical path of said partially reflected light such that the altered optical path is substantially parallel to said first optical axis, and the photo-sensitive area of said position sensitive optical detector is coplanar with the optical source.

17. An optical arrangement according to claim 1, wherein said aperture is dimensioned to limit the detection of scattered light from said object.

18. An optical arrangement according to claim 17, wherein the size of said aperture is comparable to the size of said collimated optical beam.

19. An optical arrangement according to claim 18, wherein said collimated optical beam has a spot diameter is in the region of 0.2 mm to 1.2 mm diameter.

20. An optical arrangement according to claim 17, further comprising an aperture control mechanism to vary the effective area of photo-collection on said position sensitive optical detector.

21. An optical arrangement according to claim 20, wherein said aperture control mechanism comprises a movement arrangement to change the relative displacement between said aperture and said photo-sensitive area of said position sensitive optical detector.

22. An optical arrangement according to claim 21, wherein said movement arrangement comprises a magnetic field driven voice coil.

23. An optical arrangement according to claim 1, wherein said optical source and said position sensitive photo-detector are on the same side of the object.

24. An optical arrangement according to claim 23, wherein the optical emission plane of the optical source and the optical detection plane of said position sensitive detector are parallel and facing said object.

25. A tilt monitoring apparatus for monitoring of the inclination of an object comprising an optical assembly of claim 1.

* * * * *